United States Patent [19]

Harrison

[11] Patent Number: 4,487,301

[45] Date of Patent: Dec. 11, 1984

[54] COMBINED LIVE AXLES AND DISC BRAKE ASSEMBLIES FOR VEHICLES

[75] Inventor: Anthony W. Harrison, Birmingham, England

[73] Assignee: Lucas Industries Limited, Birmingham, England

[21] Appl. No.: 316,826

[22] Filed: Oct. 30, 1981

[30] Foreign Application Priority Data

Nov. 4, 1980 [GB] United Kingdom ................ 8035379

[51] Int. Cl.³ ...................... B60K 41/26; F16H 57/10
[52] U.S. Cl. .................................. 192/4 A; 74/411.5; 188/71.5
[58] Field of Search ............... 192/4 A, 6 A, 18 A, 192/18 R; 74/411.5, 785; 188/71.1, 71.5

[56] References Cited

U.S. PATENT DOCUMENTS

| | | | |
|---|---|---|---|
| 4,010,830 | 3/1977 | Logus et al. | 192/4 A |
| 4,037,694 | 7/1977 | Keese | 188/71.5 |
| 4,223,769 | 9/1980 | Servanton et al. | 192/4 A |
| 4,317,512 | 3/1982 | Sato | 192/18 A |

Primary Examiner—George H. Krizmanich
Attorney, Agent, or Firm—Scrivener Clarke Scrivener and Johnson

[57] ABSTRACT

A live axle is combined with a brake which is disposed outboard of bearings on which a hub is journalled for rotation. The bearings are mounted on a relatively stationary axle tube, and a drive shaft is mounted within the axle tube for limited movement in an axial direction in order to transmit a brake-applying force to the brake from an actuator housed within a relatively stationary part of the axle.

10 Claims, 7 Drawing Figures

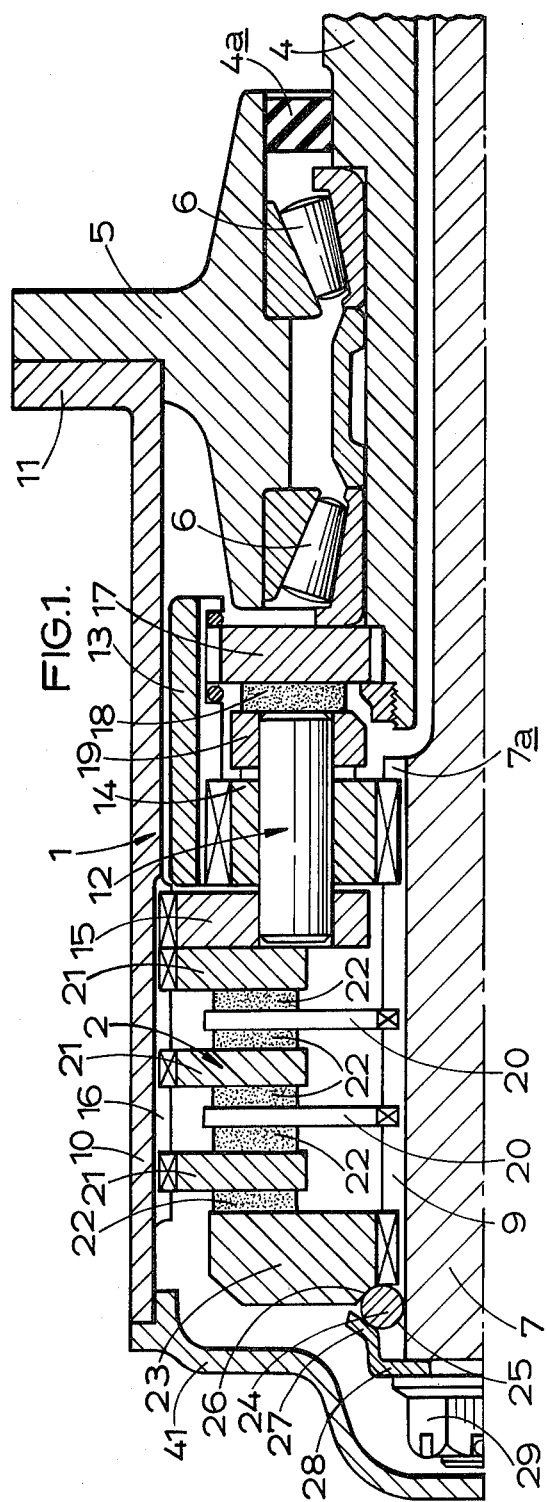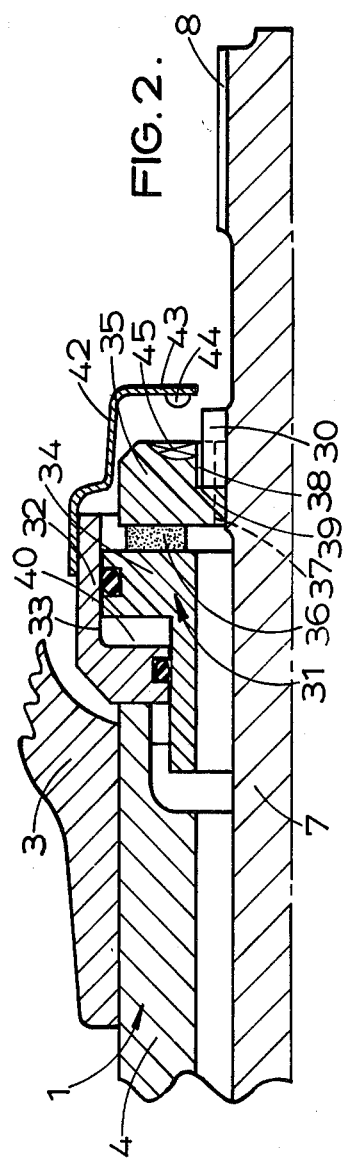

COMBINED LIVE AXLES AND DISC BRAKE ASSEMBLIES FOR VEHICLES

This invention relates to a combined live axle and brake assembly for vehicles of the kind comprising a drive shaft which is housed within a relatively stationary axle tube on which a hub, adapted to be driven by the shaft and comprising the mounting for a wheel, is journalled for rotation on wheel bearings, the brake comprising relatively rotatable friction members associated with the axle.

In known assemblies of the kind set forth the brake is mounted on the axle tube inboard of the wheel bearings and inboard of any reduction gearing, which if fitted, acts between the shaft and the hub to reduce the speed of rotation of the hub with respect to that of the shaft. In such an assembly the brake can be accommodated within a housing mounted on the axle tube which is stationary. It is therefore easy to provide means for actuating the brake, conveniently by actuating means passing through the wall of the housing. However the brake cannot be dismantled for servicing and replacement of worn friction members and other parts without first removing the wheel and dismantling the axle assembly, including the removal of any reduction gearing which may be fitted. Such maintenance may present considerable problems in the field, particularly when the vehicle is of the excavator or earth moving type equipped with massive wheels which are driven through respective sets of reduction gearing. Also, in such assemblies, it is difficult to construct an efficient brake without providing friction members of such radial dimensions that they suffer from thermal distortion. When the brake is of the dry type the brake can suffer from rapid degradation due to mud and other foreign matter and when the brake is of the oil-immersed type it is difficult to arrange for a housing containing the friction members and cooling oil to be sealed effectively.

According to our invention in an assembly of the kind set forth the brake is disposed outboard of the wheel bearings and the drive shaft is mounted in the axle tube for limited movement in an axial direction in order to transmit a brake-applying force to the brake from actuating means housed within a relatively stationary part of the axle.

This has the advantage that the brake is easily accessible for servicing without having first to remove a wheel. When reduction gearing is provided the brake is installed outboard of it so that brake maintenance can be effected without dismantling such gearing.

Also the friction members can be constructed in suitable proportions to hold flatness tolerances in manufacture and in use, in spite of any tendency for thermal distortion to occur.

When the brake comprises a disc brake of the dry type the brake is installed in a position less exposed to the effects of mud and the like than a similar brake located inboard of the wheel bearings and when the brake comprises a brake of the oil-immersed type in which the relatively rotatable friction members are located within a housing containing cooling oil sealing of the housing is facilitated.

The drive shaft may be loaded in compression or in tension when it transmits the brake-applying force to the brake from the actuating means.

The actuating means comprises an expander mechanism comprising members which are oppositely movable axially and which may be mounted in the axle tube adjacent to a casing for a differential drive unit for the drive shaft, or even in the casing itself.

The expander mechanism may be operated by any convenient means, suitably hydraulic, mechanical, pneumatic, or electro-magnetic.

The drive shaft must be capable of being withdrawn from the outer end of the axle before other parts within the axle tube and the casing can be removed. This can be achieved without special modification to the drive shaft in assemblies in which the drive shaft is loaded in compression to apply the brake. However, in assemblies in which drive shaft is loaded in tension to apply the brake, the drive shaft has a releasable connection of the bayonet type with a thrust member for co-operation with and/or forming part of the expander mechanism. In such a construction the drive shaft is so constructed and arranged that it cannot be disengaged from the thrust member without first releasing a connection between the shaft and the brake which is readily accessible at the outboard end of the axle.

Two embodiments of our invention are illustrated in the accompanying drawings in which:

FIG. 1 is a section through a combined live axle and disc brake assembly outboard of, and containing, the wheel bearings, the disc brake being of the oil-immersed type;

FIG. 2 is a section through the assembly shown in FIG. 1, but of a portion at its inboard end;

Figure 3:
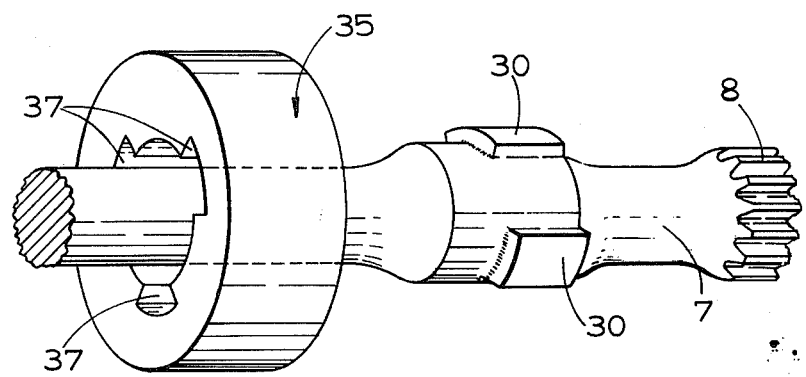
FIG. 3 is a perspective view of a connection of the bayonet type between a drive shaft and a thrust member.

The assembly illustrated in FIGS. 1 to 4 of the accompanying drawings comprises a live axle 1, and a multi-plate disc brake 2 of the oil-immersed type which is combined with the axle 1.

The axle comprises a casing 3 for a differential drive unit (not shown) from opposite ends of which project opposed hollow axle tubes of which only one is shown at 4. A hub 5 on which a wheel is adapted to be mounted is journalled for rotation on wheel bearings 6 mounted on the axle tube 4 adjacent to its outer end. A drive shaft 7 extending through the axle tube 4 is provided at its inner end with splines 8 for coupling engagement with the differential unit and has an outer free end portion of substantial axial length which projects beyond the outer end of the axle tube 4 and which is also provided with splines 9. The inner end of the shaft 7 is enclosed within a housing 10 of cup-shaped outline of which a radial flange 11 at its free inner end is connected to the hub 5 to form an axial extension of it.

The housing 10 forms the housing for the disc brake 2 and for a reduction gearing unit 12 for transmitting drive from the shaft 7 to the hub 5 at a relatively reduced speed. As illustrated a gear 13, in the form of an annulus, is concentrically arranged within the housing 10 outboard of the hub 5 and a plurality of angularly spaced planet gears, of which one is shown at 14, mesh with a gear annulus 7a on the axle 7 and the gear 13. The planet gears 14 are all carried from an annular carrier 15 which is keyed to splines 16 on the inner face of the housing 10. The gear 13 is keyed to the axle tube 4 by means of a thrust ring 17 which is secured both to the axle tube 4 and the gear 13 against relative axial and angular movement. The inner face of the ring 17 carries a friction lining 18 for engagement with a rotatable ring journal 19 in which an axle on which the planet gear 14 is mounted is received.

The disc brake 2 comprises inner and outer sets of annular plates 20 and 21 which are alternately arranged with the inner plates 20 slidably mounted on the splines 9 of the shaft 7, and the outer plates 21 slidably mounted on the splines 16 of the housing 10. Friction linings 22 carried by convenient plates are interposed between adjacent faces of adjacent plates. The innermost plate 21 abuts against the carrier 15, and a thrust plate 23 in abutment with a thrust ring 24 which is received in a groove 25 adjacent to the free end of the shaft 7 is located adjacent to the friction lining 22 which is carried by the adjacent face of the adjacent plate 21. The ring 24 is retained against radial movement in an outward direction by an abutment face 26 of arcuate outline on the thrust plate 23, and a radial flange 27 on a retainer 28 which is clamped against the free end of the shaft 7 by means of a nut 29.

The shaft 7 is also provided at an intermediate point in its length within the casing 3 for the differential unit with three radial projections 30 which extend axially and are equally spaced angularly around the axis of the shaft 7.

Brake actuating means comprising an expander mechanism 31 is housed within the casing 3 adjacent to the inner end of the axle tube 4. The mechanism 31 comprises an hydraulic cylinder 32 which encircles the shaft 7 in the region of the projections 30 and has a stepped bore 33, and an annular piston 34 which works in the bore 33. The cylinder 32 acts against the inner end of the axle tube 4, with respect to which it is keyed against movement in a axial direction, and the piston 34 acts on the shaft 7 through a annular thrust member 35 which is keyed to the shaft 7 and carries a ring 36 of friction material for abutment against the adjacent face of the piston 34.

The thrust member 35 is of a thickness greater than substantially twice the axial length of the projections 30. The thrust member 35 is provided with three angularly spaced open-ended notches 37 through which the projections 30 can pass through the thrust member 35 when they are aligned axially with the notches 37, and with three further angularly spaced notches 38 which alternate with the notches 37 and extend into the thrust member 35 for substantially one-half of its axial length from its inner face which is remote from the expander mechanism 31. Normally, in an operative position as shown in full lines in the developed view of FIG. 4, the projections 30 are received within the notches 38 and at their outer ends abut against abutment faces 39 comprising walls defining the inner ends of the notches 38.

The engagement of the splines 8 within the differential unit is arranged to provide the drive shaft 7 with a degree of end-float or relative axial movement which is sufficient to transmit a brake-applying force from the expander mechanism 31 to apply the brake 2. Specifically when the brake is to be applied with the shaft 7 rotating hydraulic fluid under pressure from a suitable supply, conveniently a pedal-operated master cylinder, is admitted into a pressure space 40 defined within and between the piston 34 and the cylinder 32 to urge the piston 34 relatively inwardly of the cylinder 32 so that it acts on the friction ring 36 carried by the thrust member 35 which is rotating with the shaft 7. This force is transmitted to the shaft 7 by the engagement of the abutment faces 39 on the thrust member 35 with the adjacent outer ends of the projections 30, and the shaft 7 is moved bodily and axially in a relatively inwards direction, being loaded in tension, thereby carrying with it the thrust plate 23 which clamps the friction plates 20 and 21, of which the different sets are rotating at different speeds, into engagement with each other to apply the brake so that both the housing 10 and the shaft 7 are braked equally. The brake applying force from the thrust plate 23 is reacted against the axle tube 4 through the carrier 15, the planet gear 14, the ring journal 19, the friction lining 18, and the thrust ring 17.

The whole assembly can be sealed by a single seal 4a on the inboard side of the wheel bearings 6, although seals will also have to be provided between a pipe-line from the master cylinder where it passes through the wall of the casing 3 and the wall of the cylinder 32.

The dimensions of the shaft 7 are chosen so that outer ends of the projections 30 are held in abutment with the faces 39 when the nut 29 is in a suitably tightened condition in which the ring 24 is retained in the groove 25.

In order to inspect the brake 2, the housing 10 is formed with a removable end cover 41, after removal of which the shaft 7 can, if required, be withdrawn from the assembly. This is achieved by first removing the nut 29 and the retainer 28 from the end of the shaft 7. Thereafter the shaft 7 is axially movable inwards with the inner end entering further into the differential unit until the projections 30 clear the notches 38 in the thrust member 35. The shaft 7 is then moved angularly about its axis until the projections are aligned with the other notches 37 whereafter the shaft 7 can be withdrawn axially through the axle tube and the housing 10 with the projections 30 passing through the notches 37.

A finger 42 projecting inwardly from the cylinder 32 has a cranked end portion 43 which carries a projection 44. The projection 44 is adapted to be engaged with an adjacent face of the thrust member 35 to limit inward movement of the thrust member 35 with the shaft 7 to enable the projections 30 to clear the notches 38 as described above, and the projection 44 is adapted to be received within a complementary recess 45 in the limit member 35 to key the thrust member against rotation when the shaft 7 is being moved angularly to affect disengagement of the projections 30 from the thrust member 35.

Figure 4:
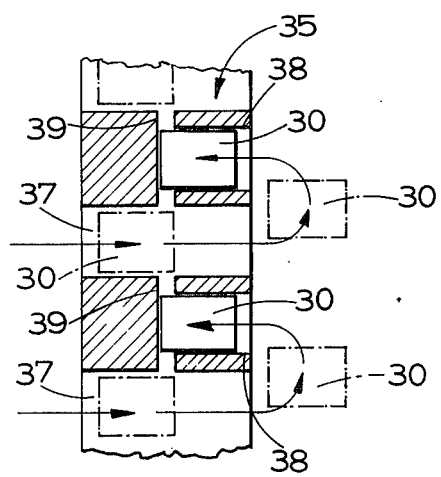
FIG. 4 is a developed view of the connection of FIG. 3.

The shaft 7 can be installed in the assembly by carrying out the steps described above, but in a reverse order, as shown by the direction of the arrows in FIG. 4.

It will be appreciated therefore that the shaft 7 and the thrust member 35 are releasably connected by means defining a coupling of the bayonet type.

Although the housing 10 in which the brake 2 is installed is disposed outboard of the hub 5, in fact due to the depth of the well of a wheel and the size of its tyre, the end of the housing will only project beyond the wheel by a relatively short distance, if at all.

Figure 5:
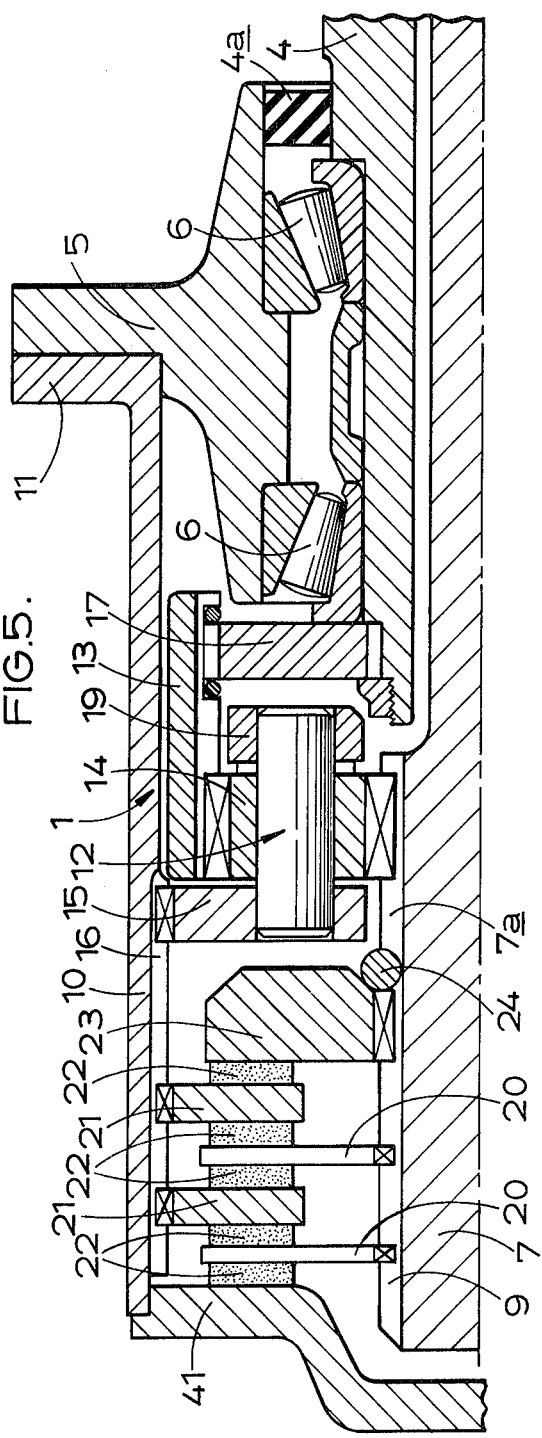
FIG. 5 is a section similar to FIG. 1 but of a second embodiment of a combined live axle and disc brake assembly.
Figure 6:
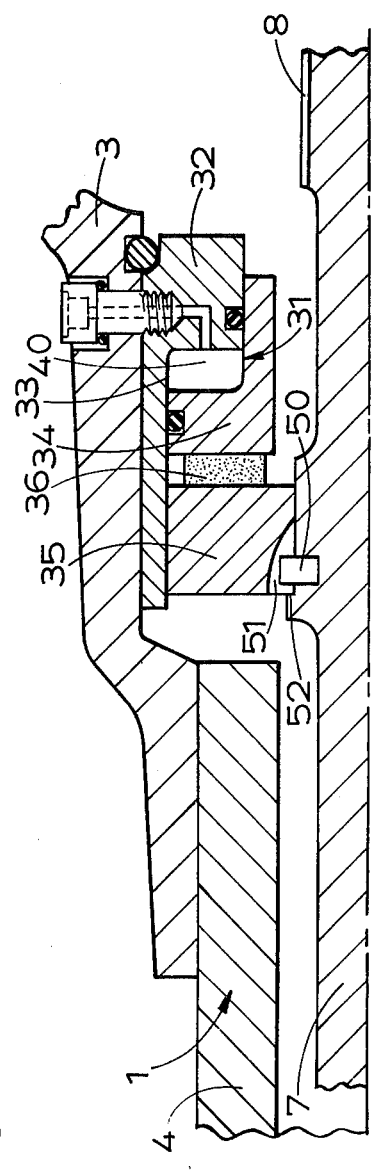
FIG. 6 is a section through the assembly shown in FIG. 5, but of a portion at the inboard end of the assembly.

In the assembly of FIGS. 5 and 6 the shaft 7 is loaded in compression when the brake is to be applied. In this construction the thrust plate 23 is mounted on the shaft 7 adjacent to the gear annulus 15 and clamps the plates 20 and 21 into engagement with each other and with a braking face defined by the inner face of the end cover 41.

The cylinder 32, the piston 34 and the thrust member 35 are oppositely arranged with the connection between the thrust member 35 and the shaft 7 comprising a key 50 which is carried by the shaft 7 and is received in a slot 51 in the adjacent end of the thrust member 35 which abuts against a thrust receiving radial shoulder 52 of the shaft 7.

The cover 41 acts as a stop through the plates 20, 21 to limit axial movement of the shaft 7 away from the differential unit and, after removal of the cover 41, the shaft 7 can simply be withdrawn axially from the open end of the housing 10.

The construction and operation of the assembly of FIGS. 5 and 6 is otherwise the same as that of FIGS. 1-4, and corresponding reference numerals have been applied to corresponding parts.

Figure 7:
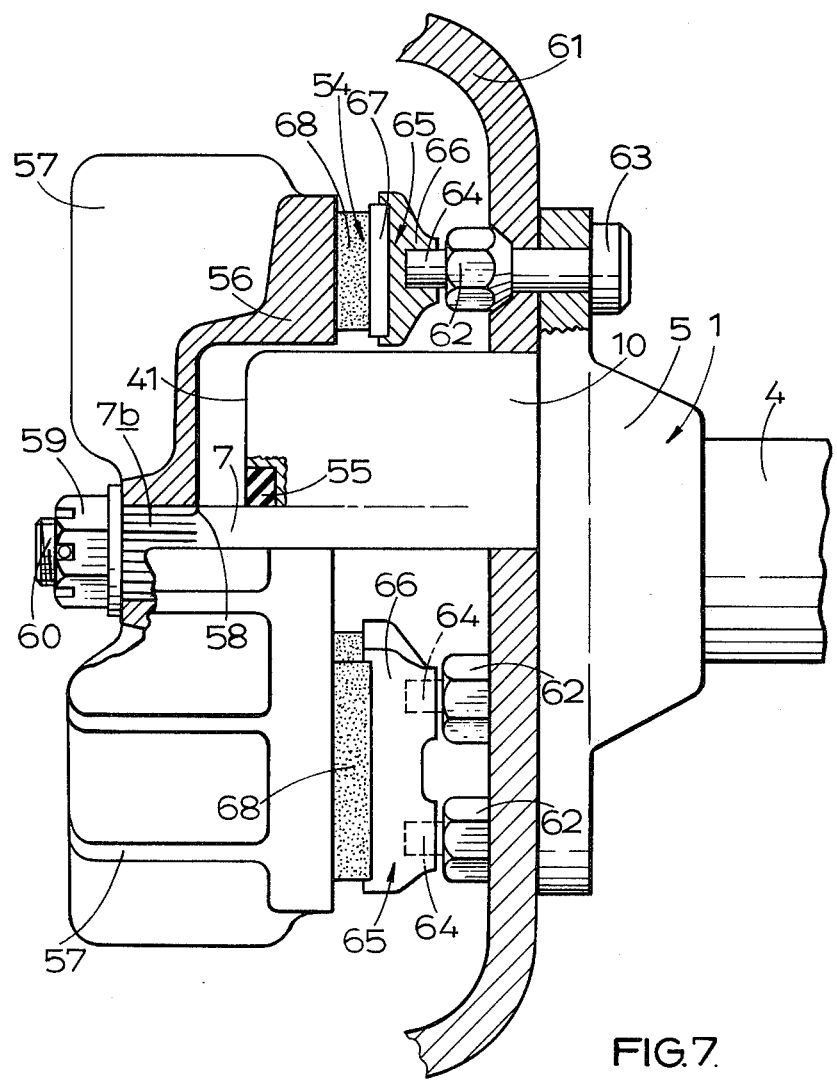
FIG. 7 is an elevation including a longitudinal part section similar to FIG. 1 but of a disc brake of the dry type.

In the assembly illustrated in FIG. 7 of the accompanying drawings the oil-immersed brake of the multi-plate type is replaced by a disc brake 54 of the dry type. As illustrated the shaft 7 projects through an opening in the end cover 41 of the housing 10 which encloses the reduction gearing unit 12 and a seal 55 is carried by the cover 41 for engagement with the shaft 7. The free end portion of the shaft 7 is provided with splines 7b on which a rotatable disc 56 is keyed for rotation with the shaft 7, and the disc 56 is provided on its outer face with a series of angularly spaced cooling vanes 57. The disc 56 is clamped against a shoulder 58 on the shaft 7 by means of a clamp nut 59 which is screwed onto a threaded portion 60 of reduced diameter at the free end of the shaft 7.

A wheel 61 is clamped against the flange of the hub 5 by nuts 62 which are screwed onto the outer projecting ends of wheel studs 63, and the wheel studs 63 are extended to project from the nuts 62 to form mountings 64 for individual friction pad assembles 65.

Each friction pad assembly 65 comprises a rigid thrust block 66 having in one face an opening in which a corresponding mounting 64 is received and in the opposite face with a recess in which a rigid backing plate 67 of complementary outline is removable received. Each backing plate 67 carries a pad 68 of friction material for engagement with the adjacent braking face on the flange of the disc 56.

When the brake 54 is to be applied with the shaft 7 rotating, as in the assembly of FIGS. 1-4, the shaft 7 is moved bodily and axially in tension in a relatively inwards direction and this carries with it the disc 56 to urge its braking face into engagement with the friction pads 68. Since the disc 56 and the wheel are rotating at different speeds, braking of the wheel is accomplished.

Due to the relatively high speed of rotation of the shaft 7 good cooling of the braking surfaces is achieved. This relatively high speed of rotation also has the advantage of generating a necessary braking torque with a brake of smaller diameter, or in obtaining a given braking effect with an effectively smaller clamp force.

The brake 54 is easy to clean, for example by means of a hose-pipe, and in any case the brake will be less dirty than similar brakes mounted inboard of the wheel bearings. Also the brake 54 is extremely easy to service without first removing the wheel 61.

The mountings 64 may be constructed and arranged to provide quasi-articulation of the friction pad assemblies 65 to accommodate disc distortion.

The assembly of FIG. 7 is otherwise the same as that described above with reference to FIGS. 1 and 2, and corresponding reference numerals have been applied to corresponding parts.

In a modification the pad assemblies 65 can be carried by a radial flange similar to the flange of the disc 56 and a complementary braking member in the form of an annulus can be mounted on the mountings 64 for rotation with the wheel 1.

In another construction multiple annular discs and friction pads may be incorporated in the brake.

I claim:

1. An assembly of a combined live axle and brake for a vehicle wherein said live axle comprises a relatively stationary part including an axle tube, wheel bearings mounted on said axle tube, a hub comprising a mounting for a wheel journalled for rotation with respect to said axle tube on said bearings, a drive shaft housed within said axle tube, and means for transmitting drive from said drive shaft to said hub, wherein said brake comprises relatively rotatable friction members associated with said axle, and actuating means housed within said stationary part for applying said brake, and wherein said brake is disposed outboard of said wheel bearings, and said drive shaft is mounted in said axle tube for limited movement in an axial direction in order to transmit a brake-applying force to said brake from said actuating means, said drive shaft being provided with first means for receiving said brake-applying force from said actuating means, and second means for transmitting said brake-applying force to said brake.

2. An assembly as claimed in claim 1, wherein said drive shaft is loaded in compression when said drive shaft transmits said brake-applying force to the brake from said actuating means.

3. An assembly as claimed in claim 1, wherein said drive shaft is loaded in tension when said drive shaft transmits said brake-applying force to said brake from said actuating means.

4. An assembly as claimed in claim 1, wherein said actuating means comprises an expander mechanism, said expander mechanism comprising first and second members, and means mounting said first and second members for relative axial movement in opposite directions.

5. An assembly as claimed in claim 4, wherein said stationary part incorporates a casing for a differential drive unit for said drive shaft, and said first and second members are mounted in said axle tube adjacent to said casing.

6. An assembly as claimed in claim 4, wherein said stationary part incoporates a casing for a differential drive unit for said drive shaft, and said first and seconds members are mounted in said casing.

7. An assembly as claimed in claim 3, including a thrust member associated with said actuating means, and said drive shaft has a releasable connection of the bayonet type with said thrust member.

8. An assembly as claimed in claim 7, wherein said drive shaft is provided at an intermediate point in the length thereof with a plurality of angularly spaced radial load-transmitting projections having outer ends upon which said actuating means acts through said thrust member to transmit said brake-applying force to said drive shaft, said thrust member being of a thickness greater than the axial length of said projections and being provided with a first set of angularly spaced open-ended notches corresponding in number to said projec-